No. 834,277. PATENTED OCT. 30, 1906.
G. A. ELWELL.
AUTOMATIC TRAIN PIPE COUPLING.
APPLICATION FILED FEB. 19, 1906.
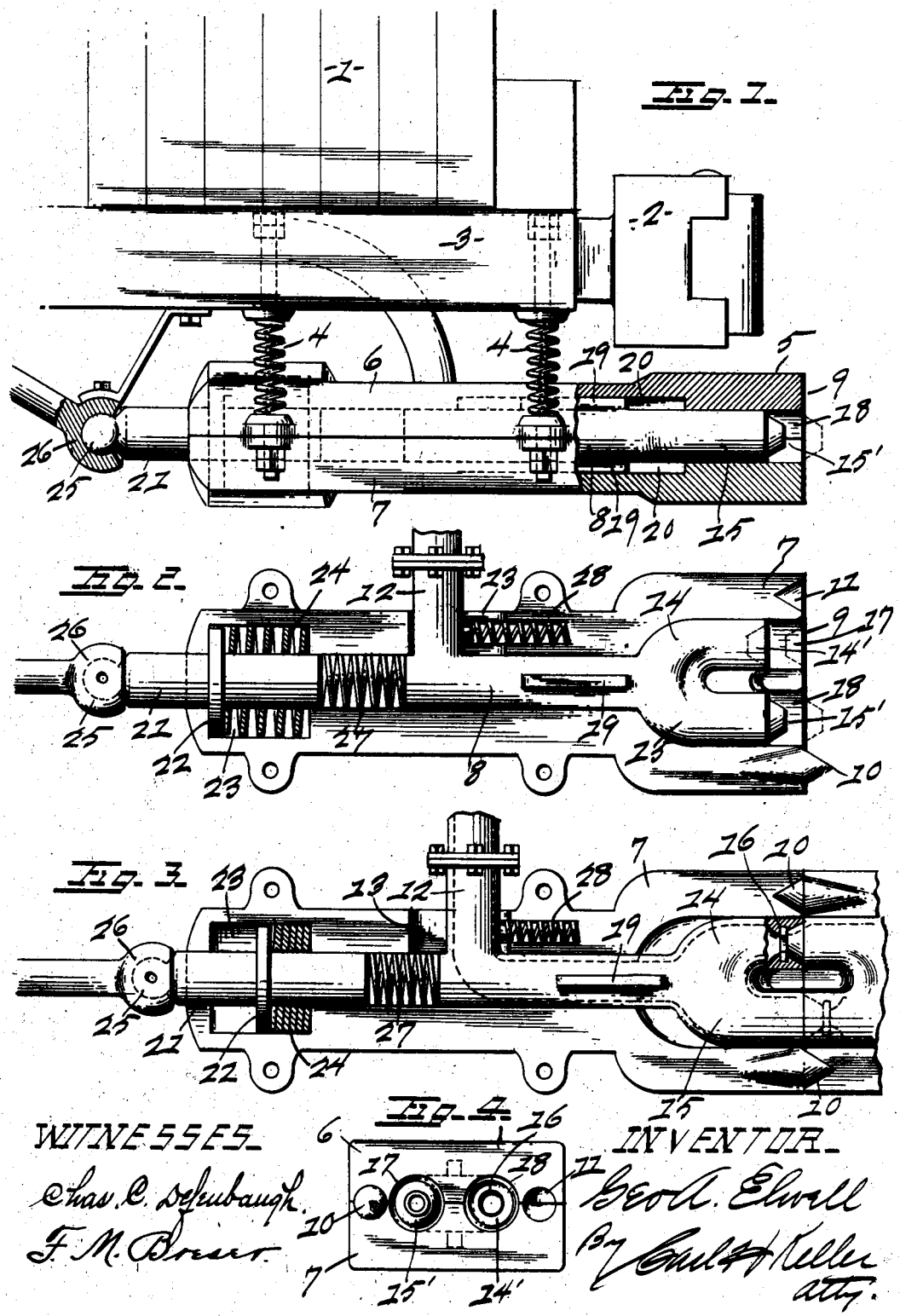
WITNESSES
INVENTOR

UNITED STATES PATENT OFFICE.

GEORGE A. ELWELL, OF TOLEDO, OHIO.

AUTOMATIC TRAIN-PIPE COUPLING.

No. 834,277.          Specification of Letters Patent.          Patented Oct. 30, 1906.

Application filed February 19, 1906. Serial No. 301,836.

*To all whom it may concern:*

Be it known that I, GEORGE A. ELWELL, of Toledo, county of Lucas, and State of Ohio, have invented certain new and useful Improvements in Automatic Train-Pipe Couplings; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to means for coupling train-pipes carrying fluids, such as air and steam, under pressure; and it has for its object to provide a device of this character which shall be simple in construction, comprising few parts, being readily assembled, and not liable to get out of order, and which shall be positive and automatic in operation.

To this end my invention comprises the novel combination, arrangement, and details of construction hereinafter shown, described, and specifically pointed out in the claims.

In the accompanying drawings, illustrative of my invention, Figure 1 is a side elevation of my improved train-pipe coupling attached to a car, the body of the device being partly in section to disclose the coupling member in retracted position therein. Fig. 2 is a plan view showing the relative arrangement of the coupler parts, the upper part of the coupler-body and the spring-hangers by which the coupler is suspended from a car being removed. Fig. 3 is a view like Fig. 2 and showing the altered position of the parts after the coupling operation, and Fig. 4 is an end view of the coupler-body and the male and female coupling ends of the coupling member therein.

Referring to the details of construction, 1 indicates a car, and 2 the usual car-coupler operating between the sills 3.

In the practical application of my invention I employ two like coupling devices which coöperate to couple the train-pipe together. Since they are identical in construction, the detailed description will be confined to one.

Suspended from the car-body by suitable spring-hangers 4 to permit free lateral and vertical movement and to also hold the same in position for coupling engagement is a cast body 5, having upper and lower sections or parts 6 and 7 and confining the yielding coupling member 8. The forward face 9 of the body 5 is adapted to contact with the face of the opposite coupling device, and therefore receives the initial coupling shock when two cars are coupled together. To insure true alined connection between the contacting faces of the coupler-bodies, there is provided on each of said faces a conical projection 10 and complementary recesses 11, the projection on the face of the one coupling device being adapted to enter the recess in the face of the other and provide interengaging connection. The coupling member 8 is a hollow casting mounted to slide longitudinally in the body 5, and the same has a laterally-extended portion 12 projecting through and operating along a slot 13 in the side of the body. The portion 12 is connected with the train-pipe in any suitable manner. At its forward end the coupling member 8 is divided into two branches 14 and 15, one of which has a conical projecting male connecting portion 14' and the other a conical recessed female connecting portion 15', a gasket 16, disposed in an annular groove in the female coupling portion, insuring a tight joint when the parts are in coupled relation.

The branching ends 14 and 15, having the male and female coupling portions thereon, are normally retracted within the body 5, and to permit said ends to be projected through the face 9 of the body there are provided in the face openings 17 and 18, arranged side by side in a transverse direction, the branching ends of the coupling member 8 being slidably disposed in said openings. Upon the upper and lower sides of the coupling member are provided ribs 19, operating along slots 20, adapted to assist in guiding the coupling member within the body 5. At its rear end the body of the coupling device is mounted to slide upon a bar 21, disposed in line with the main portion of the coupling member 8, and upon said bar is provided an enlargement 22, operating in a spring-chamber 23 and contacting with one end of said chamber to prevent the withdrawal of the body from the bar when the body is in outward position, and there is disposed within the chamber 23 to surround the bar 21 a coiled spring 24, pressing at one end against the enlargement 22 and against the outer end of the spring-chamber at the other, the action of the spring when normally expanded and when the device is uncoupled being to hold the body 5 in outward position.

Free longitudinal movement of the body 5 upon the bar 21 is permitted by reason of the suspension of the body from the car by the hanger-springs 4. At its outer end the bar 21 is provided with a ball-and-socket joint 25 to permit limited vertical or lateral movement of the body. The socket 26 of the joint is rigidly supported in any suitable manner by the car-body. Interposed between the bar 21 and the coupling member 8 is a normally expanded coiled spring 27, adapted when the body has been forced inward by coupling engagement to cause the branching ends of the coupling member to be projected through the openings in the face 9 of the body and maintain the male and female coupling ends upon said branches in yielding contact with those of the coöperating coupling device.

28 is a coiled spring of lighter tension than the spring 27. The same being disposed in a recess in the body and projecting into the slot 13 engages the lateral extension 12 of the coupling member, holding the latter normally retracted within the body when the coupling devices are uncoupled.

The operation of my improved coupling device is as follows: When in uncoupled relation, the parts of each coupling device assume the relative positions shown in Figs. 1 and 2. When the parts are thus disposed with relation to each other, the spring 27 will exert practically no pressure against the inner end of the coupling member 8, the latter being therefore readily maintained in retracted position within the body by the spring 28. The male and female coupling ends of the coupling member being also retracted within the body, said ends being rather fragile will be protected from damage resulting from violent impact of the coupling operation. The impact of the coupling operation is therefore directed against the facing ends of the couplers, which being massive castings are practically free from damage. The instant the end faces of the coupler-bodies contact the openings 17 and 18 therethrough will be alined by reason of the conical projections 10 entering the recesses 11, and as each coupler-body is forced inwardly by the coupling contact to assume the position shown in Fig. 3 both coupling members will be forced outwardly by the action of the bar 21 and the coiled spring 27 of each device, the spring 27 maintaining the male and female coupling ends of the devices in yielding contact and insuring a positive connection at all times.

Although I have illustrated and herein described means for coupling a single train-pipe, it is apparent that the same may be duplicated to permit its employment for both air and steam lines, the arrangement for two lines embodying two coupling members disposed within the body, the one immediately above the other and each operating independently of the other.

What I claim, and desire to secure by Letters Patent, is—

1. In a train-pipe coupling, an outer bumper-body, and a coupling member movable within the body and having coupling ends normally retracted therein, substantially as described.

2. In a train-pipe coupling, an outer bumper-body having end openings, and a coupling member having coupling ends normally retracted in said openings, substantially as described.

3. In a train-pipe coupling, an outer bumper-body having an elongated slot in its side, and a coupling member having coupling ends normally retracted in the body, said coupling member also having a laterally-extending portion adapted for connection with the train-pipe and disposed to operate along the slot in the body, substantially as described.

4. In a train-pipe coupling, an outer bumper-body having end openings, a coupling member slidable in the body and having coupling ends normally retracted within said end openings, and means for projecting said coupling ends through the end openings when the body is in coupling contact, substantially as described.

5. In a train-pipe coupling, an outer bumper-body having end openings, a coupling member slidable within the body and having coupling ends normally retracted within said end openings, means for projecting said coupling ends through the end openings, and means for subjecting the coupling member to yielding pressure when the coupling ends thereof are projected in the openings in the body, substantially as described.

6. In a train-pipe coupling, an outer bumper-body having end openings, a coupling member slidably disposed within the body and having male and female coupling ends, means for normally maintaining the coupling ends retracted within the openings in the body, and means for projecting said coupling ends through said openings when the body is in coupling engagement, substantially as described.

7. In a train-pipe coupling, a body suspended from a car to permit universal movement, a bar slidably connected with the inner end of the body, a spring engaging the bar and normally holding the body in outward position, a coupling member slidably disposed in the body and normally maintained in retracted position therein, and a spring interposed between said bar and the coupling member to cause the latter to be projected in the body under yielding pressure when the body is in coupled engagement, substantially as described.

8. In a train-pipe coupling, a body having end openings arranged side by side and having the projection 10 and the recess 11 adapted to aline the same when in coupled engagement with the opposite coupling device, a bar adapted to slidably support the rear end of the body, said bar having a swinging connection with a rigid support, an enlargement upon the bar adapted to contact with the body and limit its outward movement, a spring disposed between the enlargement and the body and forcing the latter in outward position, a hollow coupling member slidable longitudinally within the body and having branches provided with male and female coupling ends respectively adapted to be projected through the end openings in the body, a spring supported by the body and pressing against the coupling member to normally hold the same in retracted position in the body, and a coiled spring interposed between the aforesaid bar and the coupling member adapted to yieldingly hold the latter projected in the body when the body is in coupling engagement with the opposite coupling device, substantially as described.

In testimony that I claim the foregoing as my own I affix my signature in presence of two witnesses.

GEORGE A. ELWELL.

Witnesses:
 CARL H. KELLER,
 JUSTON ZERKLE.